United States Patent Office 3,256,045
Patented June 14, 1966

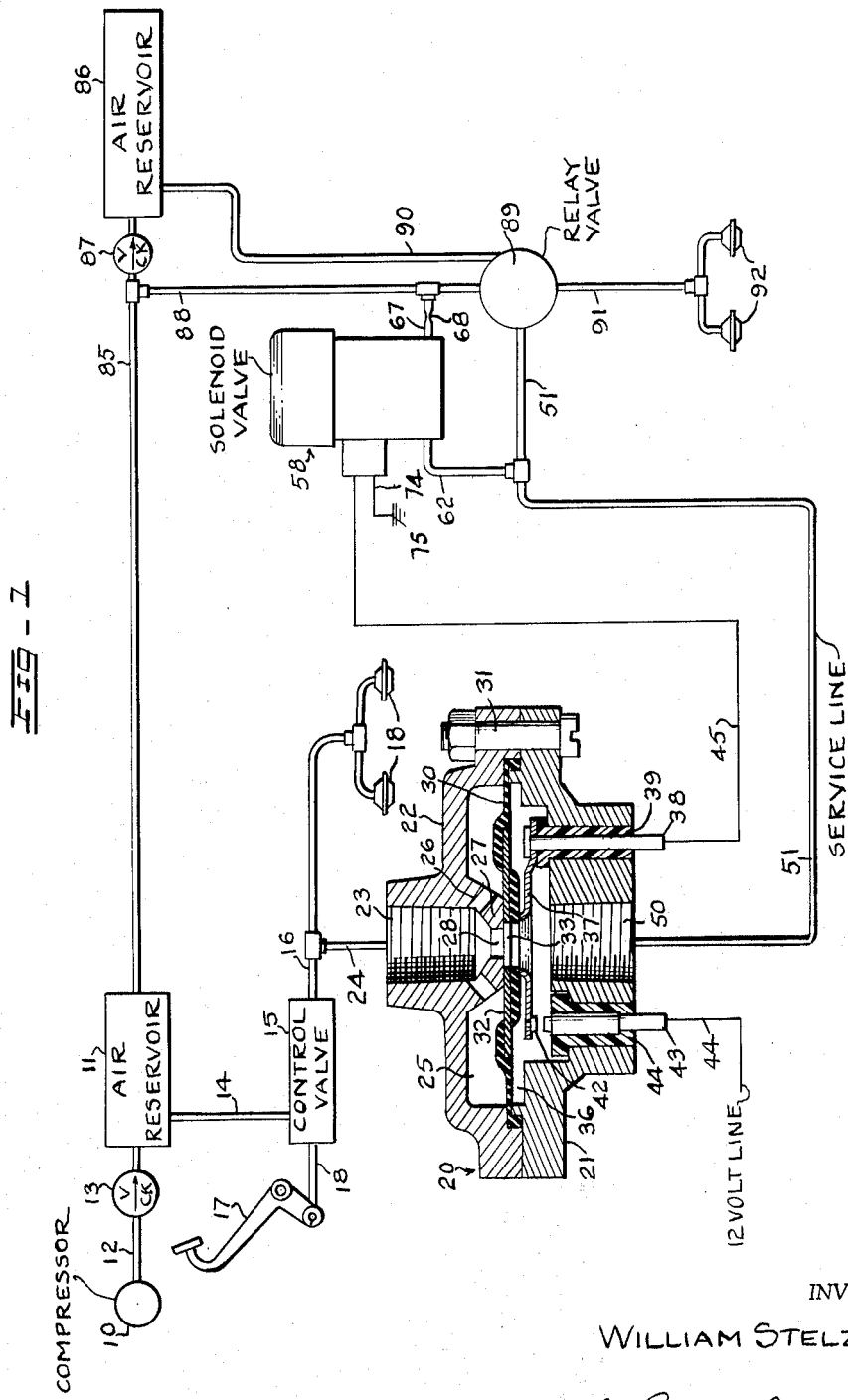

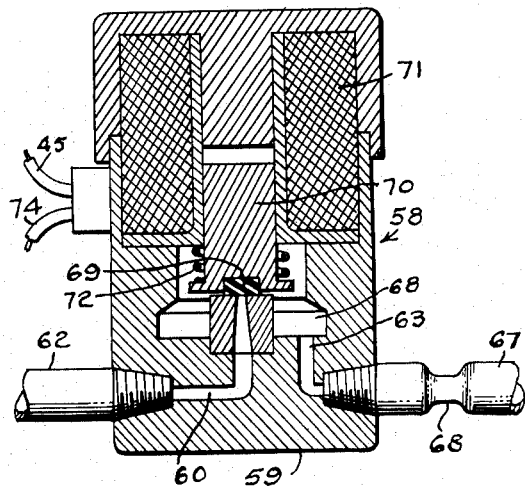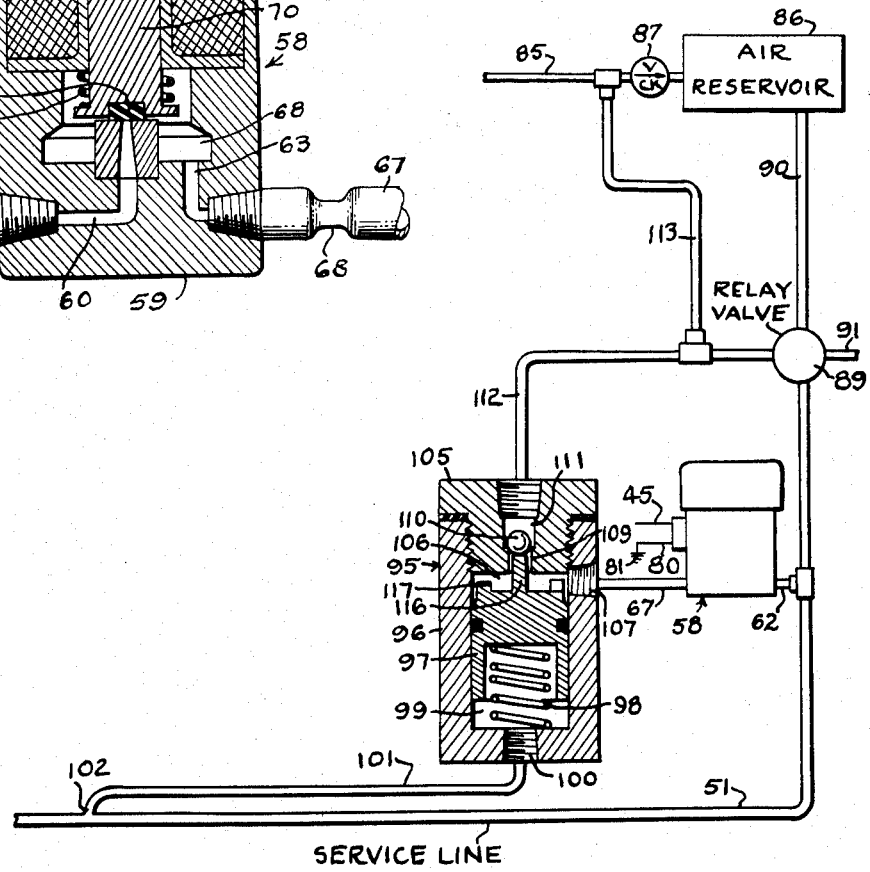

3,256,045
TRACTOR-TRAILER BRAKE SYSTEM
William Stelzer, Bloomfield Hills, Mich., assignor to Kelsey-Hayes Company, Romulus, Mich., a corporation of Delaware
Filed June 22, 1962, Ser. No. 204,456
6 Claims. (Cl. 303—15)

This invention relates to a tractor-trailer brake system and has particular reference to a novel type of electrical switch to speed up the action of the trailer brakes to prevent jackknifing.

In my copending application Serial No. 165,418, filed January 10, 1962, now Patent No. 3,151,914, I have shown and claimed a tractor-trailer brake system wherein the operation of the brake pedal on the tractor operates the main control valve to supply pressure fluid through a pressure operated switch to the tractor brake actuators, the supplying of pressure to the switch referred to closing suitable circuit means for causing operation of the relay valve on the trailer to promptly supply fluid under pressure to the trailer brake actuators, thus providing for the snubbing of the trailer brakes.

An important object of the present invention is to improve the operation of the system by employing circuit means for applying the trailer brakes before pressure has had time to build up in the service line to effect such operation, and wherein a highly novel type of switch is employed in conjunction with the circuit means, the switch being operated by the flow of pressure air therethrough rather than by direct use of pressure supplied to the switch by operation of the brake pedal, the system operating to prevent jackknifing of the tractor and trailer.

A further object is to provide a system of the character referred to wherein the switch means, instead of employing a solid pressure responsive switch closing element, such as a diaphragm having pressure operable valves therein subject to operation when the brake pedal is operated, employs a switch-closing element in the form of a diaphragm having an opening therethrough and which diaphragm is operated in accordance with the velocity of the air through the switch device, rather than depending upon direct pressure, thus providing an efficient tractor-trailer brake system wherein substantial brake pedal operation provides fast operation of the trailer brakes to prevent jackknifing.

A further object is to provide an efficient tractor-trailer brake system wherein fast trailer brake operation occurs upon substantial brake pedal operation but wherein over-braking of the trailer is prevented.

Other objects and advantages of the invention will become apparent during the course of the following description.

In the drawings I have shown two embodiments of the invention. In this showing:

FIGURE 1 is a diagrammatic view of the system, the fluid flow operated switch being shown in section;

FIGURE 2 is an enlarged axial sectional view through a solenoid valve device employed in the system, and FIGURE 3 is a fragmentary sectional view showing a modified form of an automatic valve device employed for supplying air to the relay valve.

Referring to FIGURE 1, the numeral 10 designates a source of superatmospheric pressure such as a compressor on the tractor. Air under pressure is supplied to an air reservoir 11 through a line 12 having the usual check valve 13 therein. From the reservoir 11, pressure fluid is supplied through a line 14 to a conventional brake control valve 15 having an outlet line 16. In the normal positions of the parts of the control valve 15, atmospheric pressure is present in the line 16. Upon operation of a conventional brake pedal 17, through a rod 18, the control valve 15 functions to supply air under pressure from the line 14 to the line 16. Trailer brake actuators 18 are connected to the line 16 as shown in FIGURE 1.

An air controlled switch, indicated by the numeral 20, comprises a base 21 and cap 22, the latter of which is provided with a port 23 connected to the line 16 through a pipe 24. The cap 22 is provided therein with a chamber 25 in fixed communication through ports 26 with the inlet port 23. The cap 22 is provided with a central depending portion 27 the bottom of which forms a flat seat for a purpose to be described and through which extends a port 28.

A diaphragm 30 has its periphery clamped between the peripheries of the base 21 and cap 22 by the bolts 31 employed for securing the latter members to each other. This diaphragm is formed of resilient material and has molded therein a plate 32. This plate normally engages a seat formed on the cap portion 27, and the plate and the underlying portion of the diaphragm are provided with an aperture 33 aligned with and substantially larger than the port 28 for a purpose to be described.

The base 21 is provided in the top thereof with a chamber 36 communicating with the port 33 through a central aperture in a switch plate 37. This switch plate is secured at one end to a binding post 38 mounted in an insulating bushing 39 carried by the base 21. The switch plate 37 carries a contact 42 engageable with the upper end of a binding post 43 mounted in an insulating bushing 44. The binding post 43 is connected to a 12-volt line 44, while the binding post 38 is connected to a line 45 leading to a solenoid valve to be described.

The chamber 36 is provided with a port 50 connected to the tractor-trailer service line 51.

The wire 45 leads to a two-way solenoid valve indicated as a whole by the numeral 58 and shown in FIGURE 2. The solenoid valve 58 comprises a body 59 having a passage 60 communicating with one end of a pipe 62 tapped into the service line 51 on the trailer. The body 59 is further provided with a passage 63 the lower horizontal end of which is connected to a pipe 67 to be described, having a constriction 68 therein.

The upper inner end of the passage 63 communicates with a chamber 68 normally closed by a resilient valve 69 carried by the armature 70 of the solenoid valve 58. This armature is provided with the usual coil 71 which is normally de-energized under which conditions the armature 70 is biased downwardly by a spring 72 to maintain the valve 69 closed. One end of the coil 71 is connected to the wire 45 while the other end is connected by a wire 74 to a ground 75.

The air reservoir 11 on the tractor is connected by a pipe 85 with an emergency reservoir 86 on the trailer, a check valve 87 being conventionally arranged in the pipe 85. A pipe 88 has one end tapped into the pipe 85 and has its other end connected to a conventional emergency relay valve mechanism 89. The pipe 67 is tapped into the pipe 88, and since this line is connected to the pressure line 85, it will be apparent that pressure is always present in the passage 63 (FIGURE 2) of the solenoid valve 58.

The relay valve is conventionally connected to the rear end of the service line 51 and usually depends for its operation on the building up of pressure in the service line incident to operation of the brake pedal. It is because of the time lag between the supplying of pressure to the tractor brake actuators 18 and to the relay valve 89 that the tractor brakes usually are applied ahead of the trailer brakes which is disadvantageous and dangerous as is well known.

The relay valve in accordance with conventional practice is maintained in an operative condition ready to be controlled by pressure in the service line, by pressure in the line 88. The relay valve 89 is supplied with pressure from the reservoir 86 through a pipe 90 and when the relay valve is rendered operative, it supplies pressure fluid through a line 91 to the trailer brake actuators 92. Upon a failure of pressure in the source 10 or at any point up to the check valve 87, the releasing of pressure in the line 88 will supply pressure from the line 90, regardless of pressure in the service line 51, to apply the trailer brakes.

A modified form of the system is shown in FIGURE 3 in which an automatic limiting valve device indicated as a whole by the numeral 95 is used to prevent overbraking of the trailer brakes. Referring to FIGURE 3, the valve device 95 comprises a generally cylindrical body 96 having a sealed plunger 97 axially slidable therein and biased upwardly by a spring 98 the lower end of which is arranged in a chamber 99 beneath the plunger 97. This chamber is connected through a port 100 to one end of a line 101 having its opposite end connected at a remote point 102 to the service line 51. The line 101 is of small capacity so that a minimum volume of air is used by such line.

A plug 105 is threaded in the top of the body 96 and has its lower end forming with the top of the plunger 97 a chamber 106 communicating through a port 107 with one end of the line 67 leading from the solenoid valve 58, described above. The plug 105 is provided with a port 109 normally closed by a ball valve 110 arranged in a passage 111 connected to one end of a pipe 112 the other end of which is connected to the relay valve 89 and corresponds to the pipe 88 previously described. Instead of the latter pipe, another pipe 113 is connected between the pipe 112 and the line 85 to which air under pressure is constantly supplied as described above. As in the previous case, the service line 51 is connected to the relay valve, which is supplied with pressure braking fluid from the reservoir 86 through the pipe 90.

The solenoid valve 58 is reversed from side to side compared with its showing in FIGURES 1 and 2. The line 67, communicating with the passage 63 is closed to the passage 60 by the valve 69. The line 62 is tapped into the rear end of the service line 51 close to the relay valve, as in FIGURE 1.

The plunger 97 is provided with a central stem 116, projecting through the passage 109 to unseat the ball 110 under predetermined conditions. Upward movement of the plunger 97 is limited by lugs 117 engageable against the bottom of the plug 105.

*Operation*

The parts of the switch device 20 normally occupy the positions shown in FIGURE 1, the plate 32 being at its upper limit of movement with the switch open. Assuming that a light or medium brake application is to be made, the brake pedal 17 is depressed and the control valve 15 functions to disconnect the line 16 from the atmosphere and connect it to the pressure line 14. Air under pressure thus flows to the tractor brake actuators 18 and through the port 28 and through the opening 33, and since the latter opening is larger than the opening 28, there will be a pressure drop i nthe chamber 36. Fluid will flow through the openings in the chamber 25 and the air in such chamber forces the diaphragm 30 downwardly to close the switch, the contact 42 engaging the post 43 to close a circuit from the wire 44 to the wire 45 thence to the solenoid 58 and to the ground 75. This action lifts the armature 70 (FIGURE 2) to open the valve 69 and connect the passages 60 and 63. Pressure fluid then flows from pipe 88 and pipe 67 (past constriction 68) through pipe 62 to the pipe 51 and thence to the relay valve 89 which now functions to supply pressure from the reservoir 86 to the trailer brake actuators 92. Air flowing through the pipe 62 also flows forwardly in the service line 51 to tend to fill this line. It will be noted that the line 62 is connected to the service line 51 close to the relay valve 89 to eliminate any appreciable time lag in the admission of pressure to the relay valve 89.

The downward movement of the diaphragm 30 permits air to by-pass the opening 28 to flow through the larger opening 33, thus reducing differential pressure between the chambers 25 and 36. If the flow of air is slow, as in the light brake application referred to, the differential pressure between the chambers 25 and 36 will not be sufficient to hold the switch closed, and accordingly the solenoid 58 will be de-energized to interrupt the admission of air into the service line 51 through the pipe 62. When the diaphragm 30 returns to the released position, the same action may repeat itself again, and accordingly the solenoid valve 58 may be alternately opened and closed. Since the air admitted into the service line through the pipe 62 not only flows to the relay valve 89 but is also free to flow toward the tractor, the service line is quickly brought up to the pressure existing in the pipe 16 near the control valve 15. Under such conditions the air flow through the switch device 20 is stopped, and accordingly the diaphragm 30 will remain in its upper position.

In a heavy brake application, the flow of air from the chamber 25 to the chamber 36 will be rapid, and after the switch is closed, the opening 33 offers sufficient resistance to keep the switch closed. This will allow more air to flow to the relay valve 89 and to rapidly fill the service line too. When the flow of such air is slowed down to the building up of pressure in the service line, the switch will again open due to the lack of differential pressures between the chambers 25 and 26. With the full pressure admitted to the relay valve 89, it takes a certain time to apply the trailer brakes and to fill the service line with air, as it also takes a certain time to apply the tractor brakes. The time required to fill the service line with air is substantially reduced however since air is admitted to both ends of such line. Thus the time lag ordinarily occurring before the relay valve is operated to apply the trailer brakes is eliminated, thus preventing jackknifing.

However, the air admitted to the relay valve must not cause an excessive trailer brake application. For this reason, a resistance to the flow of air into the service line is introduced for example through the medium of constriction 68 to prevent an excessive trailer brake application. As long as the service line 51 is filled with air before the trailer brakes are applied, there is no danger of the overbraking of the trailer brakes.

In the form of the invention shown in FIGURE 3 the limiting valve 95 is employed for preventing over-braking of the trailer brakes. The spring 98 biases the plunger 97 upwardly whenever pressure in the chamber 106 is not sufficient to overcome the spring 98. Under such conditions, the ball 110 will be unseated to admit pressure into a chamber 106 and thus into the pipe 67. Thus a static pressure, when the brake system is not in operation, will be maintained in the pipe 67 and passage 63. Atmospheric pressure will exist at this time in the service line and in the pipe 62.

When the brake pedal is depressed to operate the switch device 20, the solenoid 58 in FIGURE 3 will be energized to open the pipe 62 to the pipe 67 as in the previous case. Thus air under pressure will flow from the chamber 106 to pipe 67, through the solenoid device 58, and through lines 62 and 51 to the relay valve, such fluid also aiding in building up pressure in the rear end of the service line.

The flow of air through the solenoid device 58 drops the pressure in the chamber 106, and the spring 98 opens the valve 110 to admit air into the chamber 106 for the flow of such air to the relay valve to operate the trailer brake actuators, connected to the line 91. Thus the valve device 95 acts as a pressure regulating valve to supply air at a predetermined pressure above service line pressure to operate the relay valve 89 without over-braking.

As pressure is built up in the service line 51 by continued operation of the brake pedal, pressure fluid will flow through the line 101 into the chamber 99 to supplement the force of the spring 88 for opening the valve 110 or maintaining it open. Thus as pressure is built up in the line 51, the valve device 95 functions to admit more air under pressure to the rear end of the service line. This results in increased energization of the trailer brake actuators 92, increased trailer braking being acceptable at this time. The valve device 95 is so designed that pressure admitted to the solenoid valve 58 is always, for example, 15 p.s.i. higher than that existing in the service line nearer the front of the trailer where the line 101 is connected to the service line at 102. The line 101 is of restricted internal diameter as compared to the service line 51 so that a minimum volume of air is used by line 101.

From the foregoing it will be apparent that the present system provides the highly advantageous function of initially applying the trailer brakes at least as early as the tractor brakes to prevent jackknifing. The system also functions to prevent overbraking of the trailer. For light or moderate braking, the switch 37 may open and close two or more times to prevent the admission of too much air from the solenoid valve 58 to the relay valve 89, and in the form of the invention shown in FIGURE 3, the valve device 95 serves to prevent overbraking by acting as a pressure regulating valve.

Attention is invited to the fact that in the earlier application referred to the diaphragm of the switch device corresponding to the present device 20 is provided with valves normally biased to closed position which tends to maintain a pressure differential on opposite sides of the diaphragm under some conditions, for example during progressive brake application. This is not true in the present case since the diaphragm 30 is provided with the opening 33 the tendency of which is to balance pressures in the chambers 25 and 36. This arrangement of parts is such that the switch 37 will not necessarily remain closed during progressive application of the brakes, thus tending to prevent overbraking of the trailer. Moreover, the diaphragm 30 is essentially fluid-velocity operated and depends for its operation on a lower pressure in the chamber 36. When this pressure builds up incident to a building up of pressure in the service line, there will be insufficient air velocity to maintain the switch 37 closed, and the air flowing from the control valve 15 for a further build up in pressure in the service line 51 is free to flow through the openings 28 and 33 without operating the switch. The present system therefore constitutes a highly refined and efficient system for controlling the brakes of a trailer.

It is to be understood that the forms of the invention shown and described are to be taken as preferred examples of the same and that various changes in the shape, size, and arrangement of the parts may be made as do not depart from the spirit of the invention or the scope of the appended claims.

I claim:

1. In a tractor-trailer brake system, fluid pressure operated brake actuators on the tractor and on the trailer, means comprising an electrically operable device for supplying pressure fluid to the trailer brake actuators and including a circuit, a controlled pressure line, a source of pressure, a pedal operated pressure control valve connected between said source and said controlled pressure line, a fluid line connected to the tractor brake actuators, and a switch device connected in said controlled pressure line and normally providing for a limited flow of fluid therethrough, said circuit including a normally open switch in said switch device, said switch device having a member connected to said switch and subject to the velocity of fluid from said controlled pressure line, when said velocity is above the normal rate at which fluid would otherwise flow through said switch device, for closing said switch to energize said electrically operable device to cause fluid to be supplied to said trailer brake actuators, said switch device comprising a body having a cap provided with a chamber, said member connected to said switch comprising a diaphragm forming one wall of said chamber, said cap having an axial portion forming a seat normally engaging said diaphragm, said seat and said diaphragm having axially aligned openings providing said normally limited flow of fluid through said switch device, said cap having an opening communicating between said controlled pressure line and said chamber radially outwardly of said seat whereby, when said axially aligned openings cannot accommodate flow of pressure fluid through said switch device, fluid in said chamber will move said diaphragm to close said switch, fluid in said chamber flowing beneath said seat and through said opening in said diaphragm.

2. A system according to claim 1 wherein said opening in said diaphragm is larger than said opening in said seat to effect a drop in pressure between said chamber and the other side of said diaphragm and to accommodate the more rapid flow of fluid from said chamber when said diaphragm moves away from said seat.

3. In a tractor-trailer brake system, fluid pressure operated brake actuators on the tractor and on the trailer, a controlled pressure line, a first source of pressure on the tractor, a pedal operated pressure control valve connected between said source and said controlled pressure line, a fluid line connecting said controlled pressure line to the tractor brake actuators, a switch device connected to said controlled pressure line and normally providing for the limited flow of fluid therethrough, a second source of pressure on the trailer, a relay valve connected between the latter source and the trailer brake actuators, a service line connected between said switch device and said relay valve, pressure in said service line operating said relay valve to supply pressure fluid from said second source to said trailer brake actuators, and normally inoperative electrically operable means on the trailer for supplying pressure fluid to said service line near said relay valve, said switch device comprising a normally open switch in circuit with said electrically operable means, and a member connected to said switch and subject to velocity, above a predetermined point, of fluid flowing from said controlled pressure line to said service line, for closing said switch to energize said electrically operable device to operate the latter and supply pressure fluid to said service line to operate said relay valve, said switch device comprising casing sections respectively having first and second chambers therein the latter of which communicates with said service line, said member connected to said switch comprising a diaphragm separating said chambers, the section provided with said first chamber having an axial projection therein against which said diaphragm normally seats and provided with an axial port, said diaphragm being provided with an axial port communicating with said first named axial port to provide said limited flow of fluid through said switch device, said projection having openings communicating between said controlled pressure line and said first chamber to effect movement of said diaphragm to close said switch when said axial ports are of insufficient capacity for the flow therethrough of pressure fluid from said controlled pressure line.

4. In a tractor-trailer brake system, fluid pressure operated brake actuators on the tractors and on the trailer, a controlled pressure line, a first source of pressure on the tractor, a pedal-operated pressure control valve connected between said source and said controlled pressure line, a fluid line connecting said controlled pressure line to the tractor brake actuators, a switch device connected to said controlled pressure line, a second source of pressure on the trailer, a relay valve connected between the latter source and the trailer brake actuators, a service line connected between said switch device and said relay valve and pressure in which operates said relay valve to supply pressure fluid from said second source to said trailer brake actuators, said switch device normally providing for the limited flow of fluid therethrough from said controlled pressure line to said service line, normally inoperative electrically operable means on the trailer for supplying pressure fluid to said service line near said relay valve, a duct connecting said electrically operable means to one of said sources of pressure, a pressure regulating valve in said duct for supplying to said service line pressure proportional to the pressure in said one source when said electrically operable means is initially operated, said pressure regulating valve including means subject to pressure in said service line at a point remote from said relay valve for increasing the pressure supplied to said service line by said pressure regulating valve as pressure in said service line increases, said switch device comprising a normally open switch in circuit with said electrically operable means, and a member connected to said switch and subject to velocity, above a predetermined point, of fluid flowing from said controlled pressure line to said service line, for closing said switch to energize said electrically operable device.

5. A system according to claim 4 wherein said pressure regulating valve comprises a casing, a plunger therein cooperating therewith to form a chamber communicating with said electrically operable device, a valve interposed between such chamber and said one source, and a spring biasing said plunger to a position unseating said valve when pressure in said chamber drops below a predetermined point.

6. A system according to claim 4 wherein said pressure regulating valve comprises a casing, a plunger therein cooperating therewith to form a chamber communicating with said electrically operable device, a valve interposed between such chamber and said one source, and a spring biasing said plunger to a position unseating said valve when pressure in said chamber drops below a predetermined point, said pressure regulating valve having a control chamber in which said spring is arranged, said means for increasing the pressure supplied to said service line by said electrically operable means comprising a supplemental pressure line connected at one end to said control chamber and at its other end to said service line remote from said relay valve, pressure supplied through said supplemental pressure line to said control chamber supplementing the force of said spring to increase the pressure in said first named chamber of said pressure regulating valve necessary to move said plunger to allow said valve to seat.

References Cited by the Examiner

UNITED STATES PATENTS

| | | | |
|---|---|---|---|
| 1,699,163 | 1/1929 | Schiske | 73—211 X |
| 2,444,190 | 6/1948 | Fitch | 303—15 |
| 2,952,753 | 9/1960 | Kmiecik et al. | 200—81.9 |

EUGENE G. BOTZ, *Primary Examiner.*